(12) United States Patent
Farmer et al.

(10) Patent No.: US 8,567,118 B2
(45) Date of Patent: Oct. 29, 2013

(54) BELOWGROUND TREE ANCHORING APPARATUS AND METHOD

(76) Inventors: Sarah E. Farmer, New Iberia, LA (US); James W. Farmer, New Iberia, LA (US)

(*) Notice: Subject to any disclaimer, the term of this patent is extended or adjusted under 35 U.S.C. 154(b) by 1354 days.

(21) Appl. No.: 11/921,165

(22) PCT Filed: Jan. 12, 2007

(86) PCT No.: PCT/US2007/000767
§ 371 (c)(1),
(2), (4) Date: Nov. 28, 2007

(87) PCT Pub. No.: WO2007/094906
PCT Pub. Date: Aug. 23, 2007

(65) Prior Publication Data
US 2009/0133323 A1 May 28, 2009

Related U.S. Application Data

(60) Provisional application No. 60/772,903, filed on Feb. 14, 2006.

(51) Int. Cl.
*A01G 13/02* (2006.01)
(52) U.S. Cl.
USPC .................................. 47/32; 47/76
(58) Field of Classification Search
USPC .......... 47/32.3–32.8, 31, 32, 42–43, 76, 79, 9
See application file for complete search history.

(56) References Cited

U.S. PATENT DOCUMENTS

| 835,585 A | * | 11/1906 | Uffmann | 47/76 |
| 1,874,029 A | * | 8/1932 | Condon | 47/58.1 R |
| 3,571,972 A | * | 3/1971 | Carter, Jr. | 47/32.4 |

(Continued)

FOREIGN PATENT DOCUMENTS

| JP | 03112419 A | * | 5/1991 | A01G 23/04 |
| JP | 5-41928 | | 2/1993 | |

(Continued)

OTHER PUBLICATIONS

Gilmam, E.F., "Specifications for Planting Trees and Shrubs in the Southeastern U.S.," University of Florida, Jul. 2, 2003, published at edis.ifas.ufl.edu/EP112, 7 pages.

(Continued)

*Primary Examiner* — Son T Nguyen
*Assistant Examiner* — Danielle Clerkley
(74) *Attorney, Agent, or Firm* — Richard C. Litman

(57) ABSTRACT

The belowground tree anchoring apparatus (10) includes a blanket (12), a plurality of stakes (16), and a plurality of ties (14). The blanket (12) fits over the root ball (B) at the base of the trunk (R) of the tree (T) and has a center opening and an elongated, radial slit (22) for facilitating this arrangement. The blanket (12) has a plurality of peripheral tie attachment holes, which may be reinforced with grommets. The stakes (16) are driven into the planting hole (H) at the bottom of the hole (H), and each stake (16) is connected to the blanket by a tie (14), and each tie (14) is attached to the blanket (12) at one of the peripheral grommets. When the ties (14) are fully tensioned, the blanket (12) holds the root ball (B) tightly to the ground.

17 Claims, 4 Drawing Sheets

(56) References Cited

U.S. PATENT DOCUMENTS

| | | | |
|---|---|---|---|
| 3,634,970 A * | 1/1972 | Williams | 47/76 |
| 4,287,840 A * | 9/1981 | Weidner | 111/101 |
| 4,894,950 A * | 1/1990 | Yukio et al. | 47/42 |
| 5,065,543 A * | 11/1991 | Brook | 47/30 |
| 5,523,331 A | 6/1996 | Ezoe | |
| 6,408,569 B1 | 6/2002 | Obregon | |
| 6,625,926 B1 * | 9/2003 | Mancini | 47/42 |
| 6,772,558 B2 | 8/2004 | Mancini | |
| 6,942,442 B1 | 9/2005 | Green | |
| 2005/0005355 A1 | 1/2005 | Marks et al. | |
| 2005/0102892 A1 | 5/2005 | Jones et al. | |
| 2005/0152140 A1 * | 7/2005 | Frederick | 362/235 |

FOREIGN PATENT DOCUMENTS

| | | | | |
|---|---|---|---|---|
| JP | 5-153877 | 6/1993 | | |
| JP | 5-168355 | 7/1993 | | |
| JP | 5-184248 | 7/1993 | | |
| JP | 5-236830 | 9/1993 | | |
| JP | 05252838 A * | 10/1993 | | A01G 13/00 |
| JP | 9-131141 | 5/1997 | | |
| JP | 2004-65058 | 3/2004 | | |
| JP | 2004-73075 | 3/2004 | | |

OTHER PUBLICATIONS

"Rootball Fixing Systems", Platipus Earth Anchoring Systems, published at www.platipus-anchors.com at least as of Jan. 12, 2006, 2 pages.

"An Introduction to Tree Anchoring Systems," Platipus Earth Anchoring Systems, published at www.platipus-anchors.com at least as of Jul. 12, 2007, 39 pages.

* cited by examiner

BELOWGROUND TREE ANCHORING APPARATUS AND METHOD

CROSS-REFERENCE TO RELATED APPLICATION

This application is a 371 of PCT/US07/00767, filed Jan. 12, 2007 which claims the benefit of U.S. Provisional Patent Application Ser. No. 60/772,903, filed Feb. 14, 2006.

TECHNICAL FIELD

The present invention relates to arboreal anchoring devices, and more specifically to a belowground tree anchoring apparatus and method.

BACKGROUND ART

Typically newly planted trees initially require some level of assisted support to prevent tilting or toppling. Strong winds and excessive moisture can cause a poorly supported tree to lean excessively or fall to the ground. Adequate support enhances the survival of the tree during the critical growth period. The support is usually maintained until the roots have sufficiently established themselves in the ground.

Conventional methods for supporting trees typically include driving two or more stakes into the ground adjacent to the trunk of the tree and tethering the trunk to the stakes with guy wires to provide the support. However, there are several disadvantages associated with using stakes and guy wire systems. The stakes and guy wires are typically exposed above grade level of the ground, and can pose hazards to passing traffic, such as pedestrians, children, and to ground maintenance equipment, such as lawnmowers and the like. Typical above ground staking increases the likelihood of weedeater or herbicide use at the base of the tree, which can be harmful to young, tender trees. The presence of these components is also visually displeasing and often undesirably detracts from the appearance of the tree or shrub and the surrounding area. Perhaps most importantly, such guy wires can cause damage to the trees themselves by digging into the trunk of the tree and creating weak spots that prevent the tree from growing properly. Oftentimes the tree will begin to grow normally above the anchor point, but have an underdeveloped lower trunk, resulting in a weakened tree that is prone to falling.

There is a need for an apparatus and method that safely provides a tree with support at the time of planting, as well as addressing the other needs noted above. Thus, a belowground tree anchoring apparatus and method solving the aforementioned problems is desired.

DISCLOSURE OF THE INVENTION

The disclosure is directed to a belowground apparatus for anchoring a tree. The tree anchoring apparatus includes a flexible blanket that has a center opening and an elongated radial slit that extends from the center opening to the periphery of the blanket. A plurality of tie-holes are disposed adjacent to the periphery of the blanket. The blanket is dimensioned and configured for overlying the root ball of a tree, and the center opening being of the blanket is dimensioned and configured for wrapping around the trunk of a tree adjacent to the root ball. At least one fastener is disposed along the elongated radial slit. The fasteners fasten the opposite sides of the slit together around the trunk of the tree. The tree anchoring apparatus also includes a plurality of stakes that are adapted for anchoring in a hole in the ground and accommodating the root ball of the tree. A plurality of ties extend between the tie-holes in the blanket and the stakes in the ground for securing the blanket over the root ball, thereby anchoring the root ball and the tree in the ground.

The disclosure is also directed to a method for anchoring a tree below the surface of the ground. In accordance with the method, a hole is dug in the ground and the root ball of a tree is placed in hole. A blanket is then wrapped and secured around the trunk of the tree adjacent the root ball and a plurality of stakes are driven into ground within the hole adjacent the bottom of the root ball. A connecting tie is loosely attached between each of the stakes and a periphery of the securing blanket. The tree is then positioned in the hole so that the trunk of the tree is substantially straight vertically. Each of the connecting ties are then tightened to retain the root ball and the tree in position in the hole, and the hole is then filled with dirt.

BRIEF DESCRIPTION OF THE DRAWINGS

Similar reference characters denote corresponding features consistently throughout the attached drawings.

BEST MODES FOR CARRYING OUT THE INVENTION

The belowground tree anchoring apparatus is used for anchoring a tree at the time of planting and includes a flexible blanket, a plurality of stakes, and a plurality of ties. The blanket is configured to fit over the root ball at the base of the trunk of the tree and has a center opening defined by a hole or by short radial slits extending from the center, and an elongated radial slit extending to the periphery for facilitating this arrangement. The blanket is also equipped with a plurality of anchor holes (which may be protected by grommets) that are disposed in the periphery of the blanket, and fasteners for securing the two edges of the elongated slit together once the blanket has been applied about the trunk of the tree.

The stakes are provided for securing the apparatus to the ground. Each of the stakes is connected to the blanket by ties, each tie being attached to the blanket at one of the peripheral anchor holes. Each of the stakes is driven into the ground far enough inside the hole that is dug in the ground to accommodate the root ball to allow the ties to be fully tensioned, thus allowing the blanket to tightly hold the root ball, and therefore the entire tree, in the ground. The elongated slit may have a plurality of holes (which may be protected by grommets) defined along the edges of the slit that are fastened by ties extending across the elongated slit in order to close the slit after placing the blanket around the trunk of the tree. Alternatively, the fasteners used to close the elongated slit may comprise mating patches of hook and loop fasteners, a zipper, snaps, buttons, or other appropriate fasteners.

A method for belowground anchoring of a tree includes the steps of digging a hole in the ground large enough to accept the root ball of the tree, placing the root ball into the hole, wrapping the blanket around the base of the trunk at the root ball, driving the plurality of stakes into the ground within the hole, loosely attaching the plurality of connection ties between the plurality of stakes and the periphery of the securing blanket, positioning the tree, tightening the ties to tension the tree for retaining the root ball within the hole, and filling in the hole. These steps may be performed in any suitable order as practicable, e.g. attaching the ties to the stakes before placing the tree in the hole.

Figure 1:
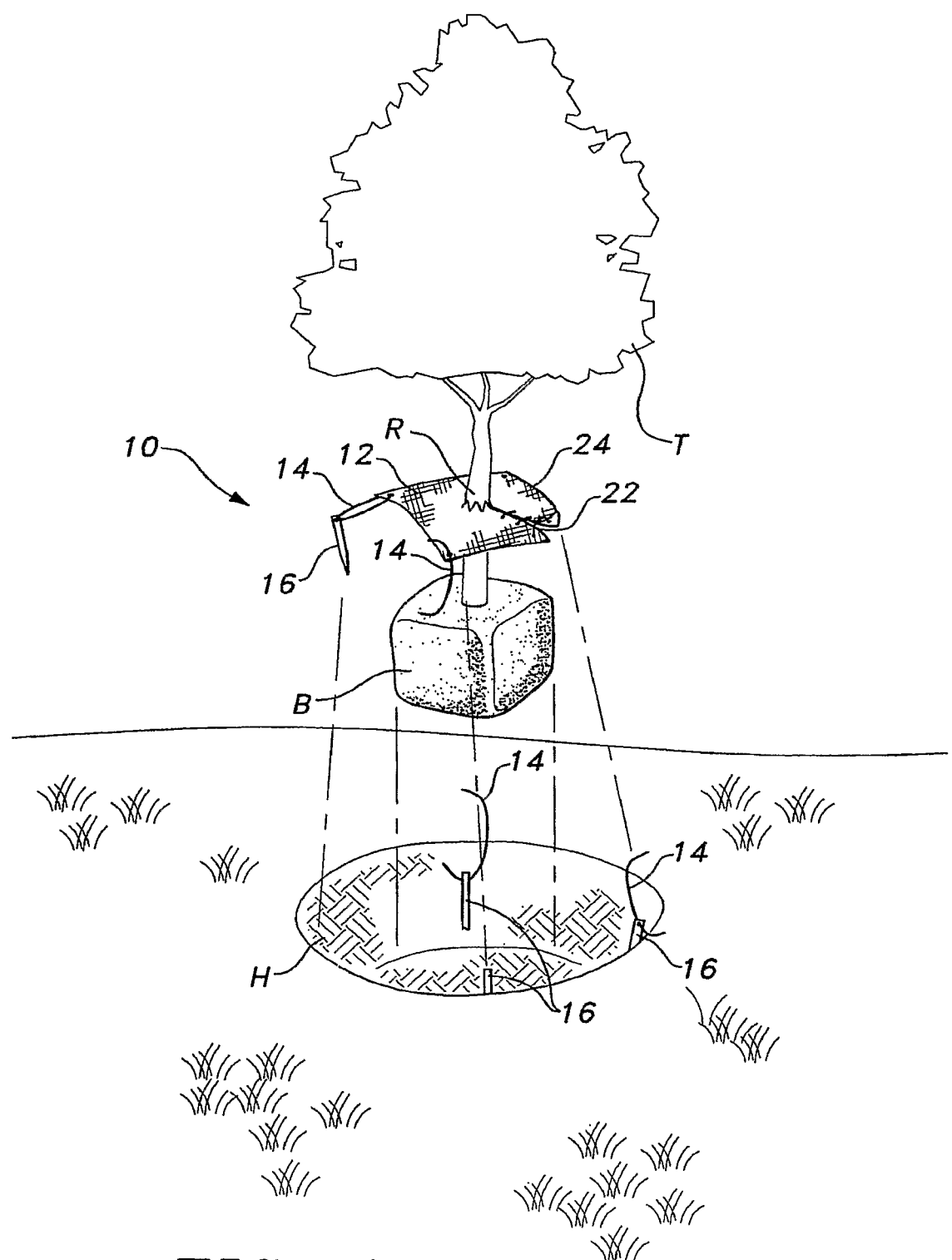
FIG. 1 is an environmental, exploded, perspective view of a belowground tree anchoring apparatus according to the present invention showing a tree being planted in a hole, the flexible anchor blanket, anchoring stakes within the hole, and ties for securing the blanket to the stakes.
Figure 2:
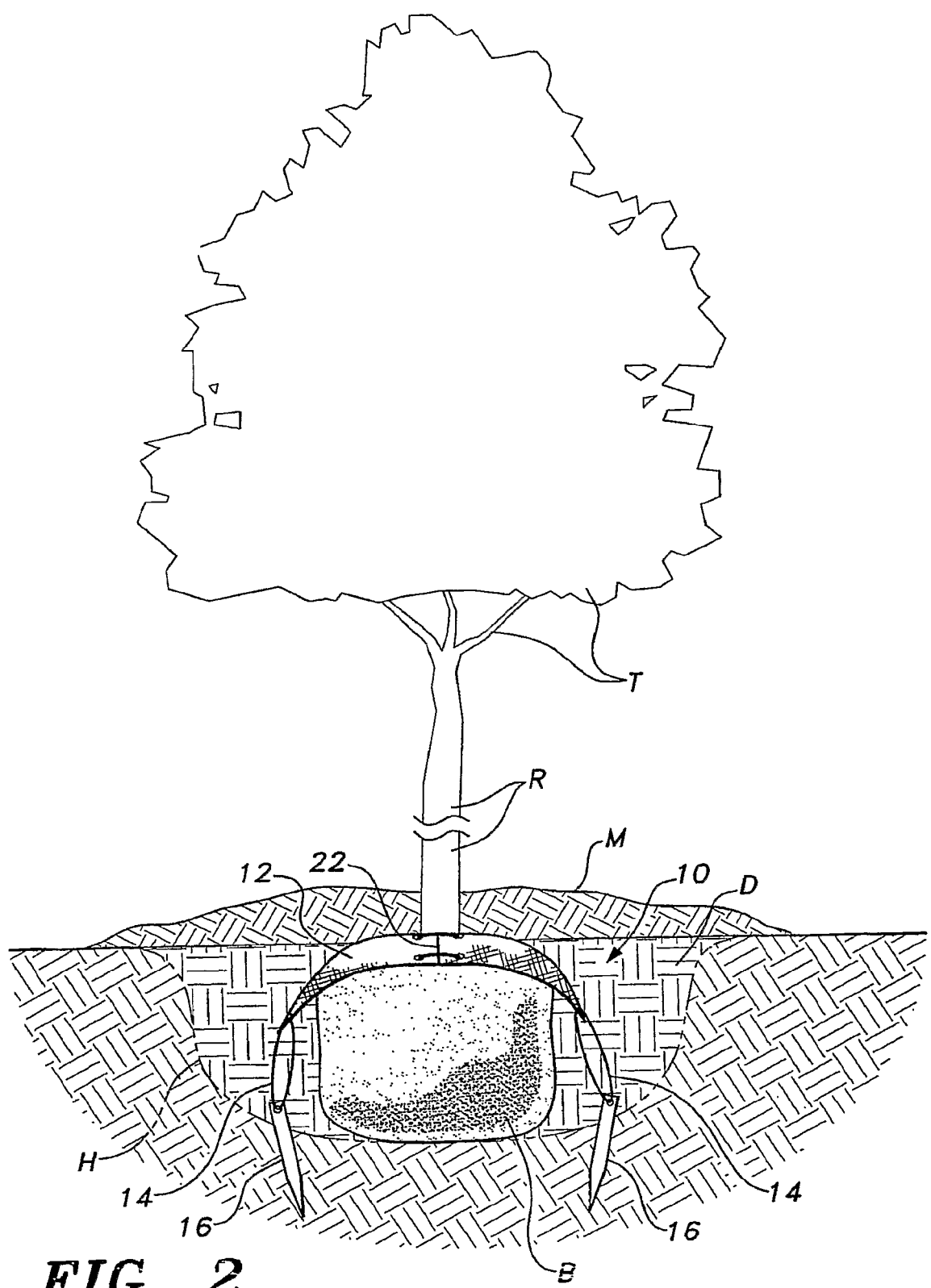
FIG. 2 is a diagrammatic environmental side elevation view of a belowground tree anchoring apparatus according to the present invention.
Figure 3:
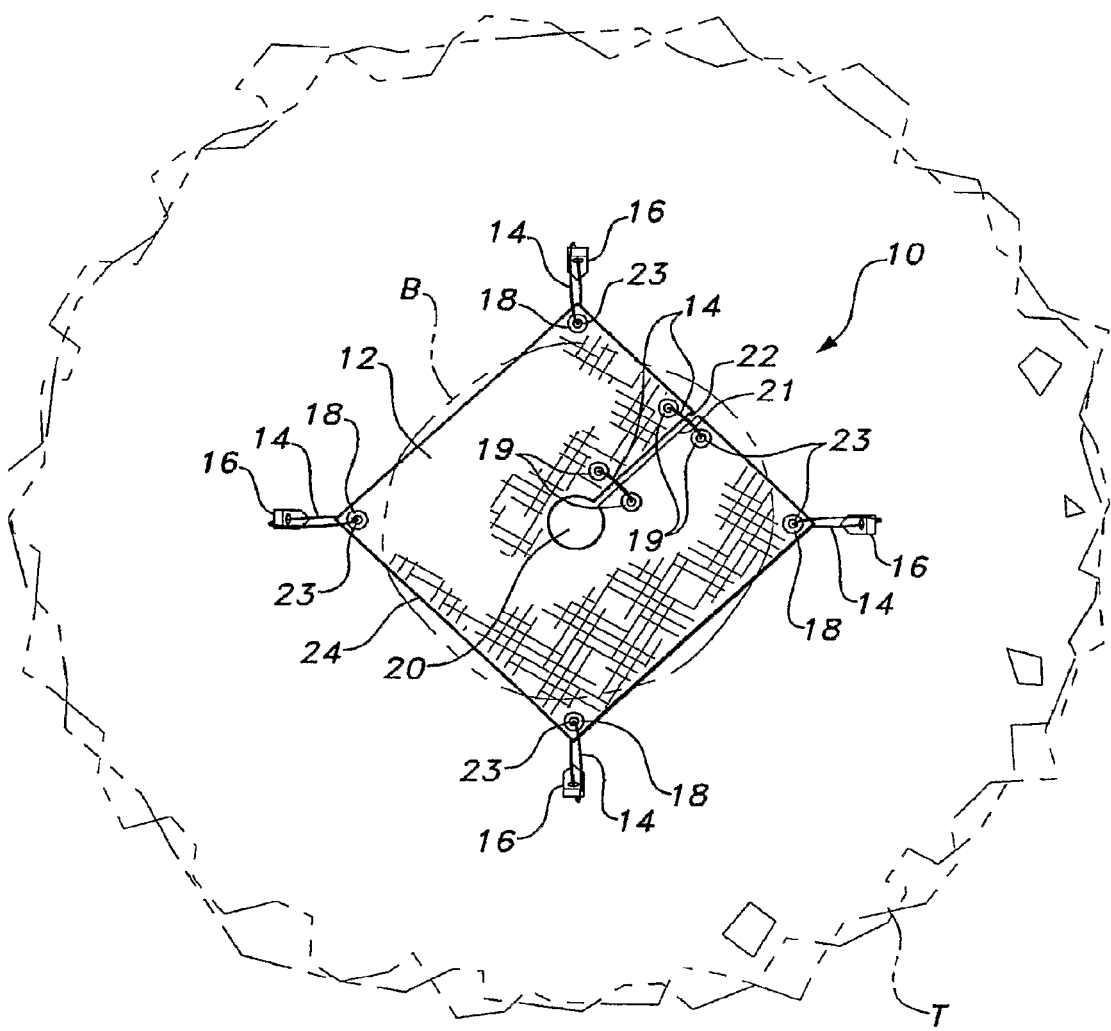
FIG. 3 is a top view of a belowground tree anchoring apparatus according to the present invention.

The belowground apparatus of the present invention is designated generally as 10 in the drawings. Referring to FIGS. 1 through 3, the anchoring apparatus 10 is shown having a flexible blanket 12, a plurality of stakes 16, and a plurality of ties 14. Anchoring apparatus 10 is configured to anchor a tree T having a root ball B belowground so that most, if not all, of anchoring apparatus 10 is belowground.

Blanket 12 has a center opening 20 for receiving the trunk of tree T and an elongated radially disposed slit 22 extending between the center opening 20 and the periphery 24 of the blanket 12. The two opposed edges 21 of the slit 22 are opened or spread to allow the blanket 12 to be positioned about the trunk R of the tree T, with the trunk R passing through the center opening 20 of the blanket 12. Blanket 12 rests directly on top of root ball B at the base of the trunk R of tree T. Blanket 12 is also provided with a plurality of tiedown anchoring (or tie-) holes 18 disposed along the periphery 24 thereof, and may be provided with a plurality of slit closure attachment holes 19 disposed along each of the slit edges 21. Preferably, each of the holes 18 and 19 has a grommet 23 or other reinforcement installed therein in order to distribute the tensile load on the corresponding holes 18, 19 and avoid tearing the blanket 12 material.

Alternatively, it will be seen that other slit fasteners may be used for approximating the edges of the elongated slit 22 after the blanket 12 has been placed around the trunk R of the tree T, e.g., stitching, snaps, buttons, cooperating hook and loop fabric material, interlocking tooth zipper, etc. as desired. Preferably, the peripheral tie-holes 18 are arranged about the periphery 24 of the blanket 12 to reduce any tendency to spread or pull apart the two edges 21 of the slit 22 when the ties 14 are tightened.

The blanket 12 of FIGS. 1 through 3 is square or rectangular in shape, and the first plurality of tie-holes 18 may include four such holes 18, one placed in each corner of blanket 12. Slit closure attachment holes 19 may also be placed along each edge 21 of the slit 22 as opposed pairs, with a hole 19 of each pair being placed on opposite sides of slit 22. The blanket 12 may be made of any practicable material as desired, e.g., woven cloth, nonwoven plastic sheet, etc., which is preferably relatively thin and flexible or pliable sheet material in order to conform to the upper contour of the root ball B when secured thereover, as shown in FIG. 2 of the drawings. Preferably, the blanket 12 is formed of a woven or nonwoven biodegradable material. The Du Pont Company manufactures a biodegradable woven fabric material under the trade name Green-Vista™, used for anchoring seedbeds and similar purposes. This fabric is woven from Xavan® fiber, a polypropylene material which deteriorates over time when exposed to sunlight and the outdoor environment. Alternatively, the blanket 12 may be formed of a nonwoven biodegradable material, such as Weed Control Fabrics, manufactured by the DuPont Company from a high-density spunbonded polypropylene material. Again, other natural or synthetic materials may be used as desired, as noted further above. Any of the blanket materials may be impregnated with various forms of plant treatment chemicals or compounds as desired, e.g., a time-releasable fertilizer compound. One such product is known by the trade name Osmocote®, and may be applied particularly to the lower surface of the blanket 12, which is adjacent the root ball B of the tree T. The above-described materials are exemplary only, and other suitable materials may be used in lieu thereof.

It will be understood that the blanket may be provided in different sizes and shapes to accommodate the size of the trunk and root ball of the tree. For example, to accommodate trees that are supplied in 30-, 50-, and 70-gallon containers, the blanket 12 may have a round, hexagonal, octagonal, or other polygonal shape. Tie-holes are preferably located at the vertices of the polygon (or the periphery of a round or circular blanket), with a hexagonal blanket requiring six anchor stakes and an octagonal blanket requiring eight stakes to firmly secure the blanket over the root ball B of the tree T. The additional stakes provide more secure anchoring of the relatively large root ball in such plantings.

Figure 4:
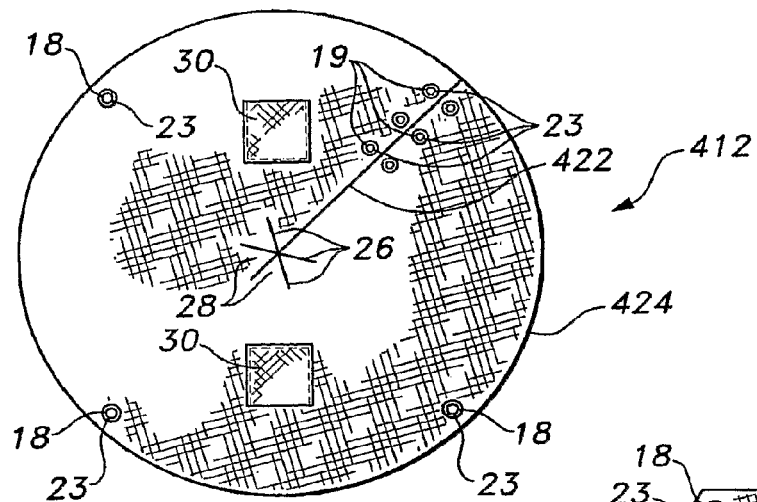
FIG. 4 is a top plan view of an alternative embodiment of an anchoring blanket configuration for a belowground tree anchoring apparatus according to the present invention, wherein the blanket has a circular configuration with a plurality of center opening defined by short radial slits for clearing the trunk of the tree.
Figure 5:
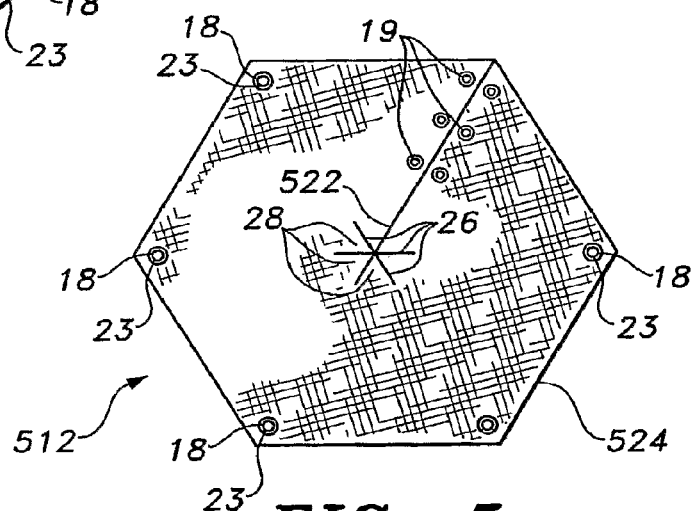
FIG. 5 is a top plan view of another alternative embodiment of an anchoring blanket for a belowground tree anchoring apparatus according to the present invention, wherein the blanket has a hexagonal configuration.
Figure 6:
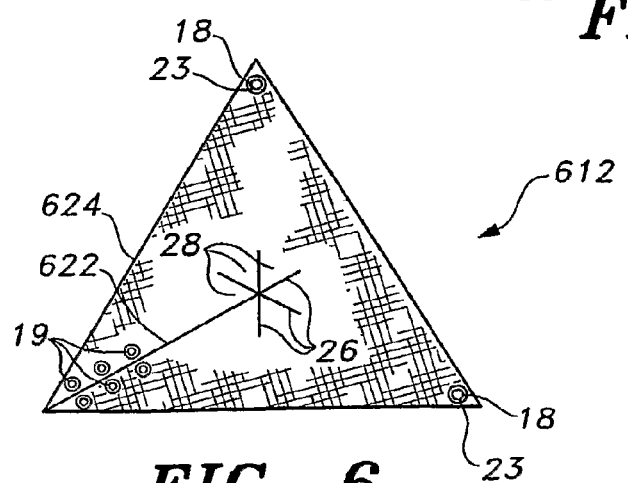
FIG. 6 is a top plan view of another alternative embodiment of an anchoring blanket for a belowground tree anchoring apparatus according to the present invention, wherein the blanket has a triangular configuration.

FIGS. 4 through 6 provide plan views of three such exemplary blankets, respectively designated as blankets 412, 512, and 612. The blanket 412 is not polygonal, but is circular in plan form, having a circular periphery 424. Alternatively, a blanket having a curved or rounded periphery may be formed as an oval or elliptical shape, if so desired. The blanket 412 includes a plurality of peripheral tiedown holes 18, just as in the case of the peripheral holes 18 of the embodiment illustrated in FIGS. 1 through 3, with the holes 18 reinforced by grommets 23. While four such tie-holes 18 are shown in the embodiment of FIG. 4, it will be understood that any practicable number of tiedown holes may be provided in such a blanket 412 having a circular periphery 424. An elongated, radially disposed slit 422 extends from the center opening to the periphery 424, with a plurality of slit closure attachment holes 19 and grommet reinforcements 23 located to each side of the slit 422.

The blanket 412 of FIG. 4 differs from the blanket 12 of FIGS. 1 through 3 in other respects as well. It will be noted that, whereas the center opening 20 of blanket 12 is defined by a circular hole (best seen in FIG. 3), the center opening of the blanket 412 is formed by a plurality of short, radially disposed trunk clearance slits 26, with the slits 26 defining a corresponding plurality of trunk clearance flaps 28 therebetween, which bend or fold backward to accommodate the trunk of the tree due to the flexible or pliable nature of the material from which blanket 412 is formed. The trunk clearance slits 26 do not extend to the periphery 424 of the blanket 412, but have sufficient length to allow for the diametric growth of the tree trunk passing therethrough without restricting the growth or damaging the trunk until removal or biodegradation of the blanket 412.

Also, a pair of treatment additive pockets 30 are attached to the blanket 412. These pockets 30 may be applied to any of the blanket embodiments of the present invention, and may contain time-release fertilizer material, time-release herbicide (i.e., weed killer), and/or any practicable material that may be beneficial to the subject tree. While two such pockets 30 are shown in the blanket embodiment 412 of FIG. 4, it will be understood that a single such pocket, or more than two such pockets, may be provided on any embodiments of the blanket described herein.

FIG. 5 provides a plan view illustration of yet another embodiment of the blanket, designated as blanket 512. The blanket 512 is formed of the same materials as the other blanket embodiments 12 and 412, as described further above, and includes a plurality of peripheral tie-holes or anchor attachment holes 18 and a plurality of slit closure attachment holes 19 disposed to each side of the elongated radial slit 522. Some or all of these holes or passages 18 and/or 19 may be provided with reinforcing grommets 23, as desired. It will be noted that the primary difference between the blanket 512 of FIG. 5 and other blankets described herein is the hexagonal periphery 524 of the blanket 512. Accordingly, one tie-hole 18 is located at five of the six apices of the hexagonal blanket. The elongated radial slit 522 preferably extends from the central trunk clearance opening, formed by trunk clearance slits 26 and flaps 28, to one of the vertices of the polygonal blanket 512. This slit configuration may be incorporated in other polygonal embodiments as well, e.g., in the square or rectangular blanket 12 shown in FIGS. 1 through 3, if so desired. The extension of the slit 522 to one vertex of a polygonal blanket allows the outermost slit closure attachment holes 19 to also serve as a pair of closely spaced tie-holes at the slit vertex, thereby avoiding the tendency for the anchor ties to spread the two sides of the slit apart. The hexagonal blanket 512 may include pockets for containing a time-release treatment product of some sort, if so desired, in the manner of the optional pockets 30 shown in the blanket embodiment 412 of FIG. 4.

FIG. 6 provides a plan view of still another embodiment of the tree anchoring blanket, comprising triangular blanket 612. The blanket 612 has a triangular periphery 624, with two of the three vertices having tiedown holes 18 installed thereat and the third vertex using the outermost pair of slit closure attachment holes 19 as the tiedown holes. Each of these holes 18 and 19 may be reinforced with grommets 23 or other reinforcement means (e.g., multiple thickness of fabric, stitching, etc.) as desired. The triangular blanket 612 includes an elongated radial slit 622 extending from the center of the blanket 612 to one vertex thereof, with the center opening formed by a plurality of trunk clearance slits 26 defining a corresponding plurality of trunk clearance flaps 28 in the manner of the blanket embodiments 412 and 512 of FIGS. 4 and 5. It will be understood that a center opening of a predetermined diameter may be provided in lieu of the slits and flaps in any of the embodiments of FIGS. 4 through 6, if so desired; or the embodiment of FIGS. 1 through 3, with its circular trunk clearance hole, may be provided with the slit and flap arrangement of the embodiments of FIGS. 4 through 6, if so desired.

A method for anchoring a tree that includes the use of the apparatus includes the steps of digging a hole in the ground large enough to accept the root ball of the tree; removing the tree from its container, if the tree is containerized; placing the root ball in the hole with the top of the root ball at ground level; wrapping the blanket around the base of the trunk of the tree adjacent the root ball; attaching the fasteners which may be ties or other fasteners, across the elongated radial slit in the blanket; driving the plurality of stakes into the ground within the hole adjacent the bottom of the root ball (about one-two inches outside the root ball); loosely attaching the plurality of connection ties between the plurality of stakes and the periphery of the securing blanket; positioning the tree so that the trunk is upright, being aligned substantially straight vertically; tightening the ties between the blanket and the stakes to tension the connection ties and retain the root ball within the hole; and filling the hole with dirt. Mulch may be placed over the filled-in hole to retain moisture and prevent the growth of grass and weeds around the trunk of the tree. The steps may be performed in any suitable order that accomplishes the same result.

As described above, the blanket 12 may be provided with a pocket containing a time-release fertilizer, or the blanket may be coated with a time-release fertilizer, to avoid the necessity for periodic fertilization while the tree is establishing its root system. An appropriate time-release fertilizer incorporated into the tree anchoring apparatus may avoid the need for further feeding up to one year. Otherwise, a small amount of time-release fertilizer may be placed on the ground after filling the hole and before applying the mulch. Chopping the soil and adding a small amount of water to the soil may ease the process of filling the hole.

The stakes 16 are preferably formed of wood for economy and biodegradability, but other materials (plastic, metal, etc.) may be used for the stakes. The ties may comprise plastic ratcheting locking ties (e.g., Ty-Raps®), cord, twine, or the like formed of natural or synthetic materials, metal cable or the like.

It is to be understood that the present invention is not limited to the embodiments described above, but encompasses any and all embodiments within the scope of the following claims.

The invention claimed is:

1. A belowground apparatus for anchoring a tree, comprising:
   a flexible blanket made of biodegradable material defining a periphery, the blanket having a center opening and an elongated, radial slit extending from the center opening to the periphery, and a plurality of tie-holes disposed adjacent the periphery defined therein and a plurality of tie-holes disposed along opposite edges of the elongated radial slit, the blanket being dimensioned and configured for overlying a root ball of the tree, the center opening being dimensioned and configured for wrapping around a trunk of the tree adjacent the root ball and free to flex as the trunk expands in diameter;
   a plurality of grommets, each of the tie-holes having one of the grommets installed about the tie-hole;
   a plurality of ties fastenable between the plurality of tie-holes disposed along the edges of the elongated radial slit for fastening opposite sides of the slit together around the trunk of the tree;
   a plurality of stakes adapted for anchoring in a hole in the ground accommodating the root ball of the tree; and
   the plurality of ties extending between the tie-holes in the blanket and the stakes for securing the blanket over the root ball, thereby anchoring the root ball and the tree in the ground.

2. The belowground apparatus according to claim 1, wherein the center opening is a hole defined in the blanket at a center thereof.

3. The belowground apparatus according to claim 1, wherein the center opening is a plurality of short, radial slits at a center thereof defining a plurality of flexible flaps adapted for folding away from the trunk of the tree.

4. The belowground apparatus according to claim 1, wherein said blanket is circular in shape.

5. The belowground apparatus according to claim 1, wherein said blanket is polygonal in shape, the blanket having at least one tie-hole defined in each of the vertices of the polygon.

6. The belowground apparatus according to claim 5, wherein the elongated, radial extending slit extends between the center opening and one of the vertices of the polygon.

7. The belowground apparatus according to claim 1, further comprising at least one treatment additive pocket disposed upon the blanket.

8. The belowground apparatus according to claim 1, wherein the blanket is formed of woven biodegradable material.

9. The belowground apparatus according to claim 1, wherein the blanket is formed of nonwoven biodegradable material.

10. The belowground apparatus according to claim 1, wherein the blanket is coated with a time-release fertilizer.

11. A method for anchoring a tree below the surface of the ground, comprising the steps of:
digging a hole in the ground large enough to accept a root ball of a tree;
placing the root ball of the tree into the hole;
providing a belowground apparatus for anchoring the tree, the belowground apparatus comprising: a flexible blanket made of biodegradable material defining a periphery, the blanket having a center opening and an elongated, radial slit extending from the center opening to the periphery, and a plurality of tie-holes disposed adjacent the periphery defined therein and a plurality of tie-holes disposed along opposite edges of the elongated radial slit, the blanket being dimensioned and configured for overlying the root ball of the tree, the center opening being dimensioned and configured for wrapping around a trunk of the tree adjacent the root ball and free to flex as the trunk expands in diameter;
a plurality of grommets, each of the tie-holes having one of the grommets installed about the tie-hole;
a plurality of ties fastenable between the plurality of tie-holes disposed along the edges of the elongated radial slit for fastening opposite sides of the slit together around the trunk of the tree;
a plurality of stakes adapted for anchoring in a hole in the ground accommodating the root ball of the tree; and
the plurality of ties extending between the tie-holes in the blanket and the stakes for securing the blanket over the root ball, thereby anchoring the root ball and the tree in the ground;
wrapping a blanket around the trunk of the tree adjacent the root ball;
driving the plurality of stakes into ground within the hole adjacent the bottom of the root ball;
loosely attaching at least one of the plurality of ties between each of the stakes and a periphery of the blanket;
positioning the tree in the hole so that the trunk of the tree is substantially straight vertically;
tightening each of the at least one of the plurality of ties to tension the at least one of the plurality of ties for retaining the root ball and the tree; and
filling the hole with dirt.

12. The method for anchoring a tree according to claim 11, wherein said step of placing the root ball in the hole further comprises positioning the top of the root ball substantially level with the ground.

13. The method for anchoring according to claim 11, further comprising the step of placing a time-release fertilizer within a pocket formed on the blanket.

14. The method for anchoring according to claim 11, wherein said blanket is coated with a time-release fertilizer.

15. The method for anchoring according to claim 11, further comprising the step of placing mulch over the filled-in hole.

16. The method for anchoring according to claim 15, further comprising the step of placing fertilizer on the ground adjacent the tree before the step of placing mulch.

17. The method for anchoring according to claim 16, further comprising the step of adding water to the mulched, filled-in hole.

* * * * *